(12) United States Patent
Rylewski

(10) Patent No.: US 7,036,560 B1
(45) Date of Patent: May 2, 2006

(54) HEAT EXCHANGE UNIT, IN PARTICULAR FOR VENTILATING A BUILDING

(75) Inventor: Eugeniusz Rylewski, 43 Bis avenue du Général Leclerc—F-78470, Saint Remy les Chevreuse (FR)

(73) Assignee: Eugeniusz Rylewski, Saint Remy les Chevreuse (FR)

( * ) Notice: Subject to any disclaimer, the term of this patent is extended or adjusted under 35 U.S.C. 154(b) by 0 days.

(21) Appl. No.: 09/786,584

(22) PCT Filed: Sep. 23, 1999

(86) PCT No.: PCT/FR99/02266

§ 371 (c)(1),
(2), (4) Date: Apr. 16, 2001

(87) PCT Pub. No.: WO00/19151

PCT Pub. Date: Apr. 6, 2000

(30) Foreign Application Priority Data

Sep. 25, 1998 (FR) .................................. 98 12028

(51) Int. Cl.
*F24H 3/02* (2006.01)
*F28F 7/00* (2006.01)
(52) U.S. Cl. ........................... 165/54; 165/46; 165/165
(58) Field of Classification Search .................. 165/54, 165/165, 46, 136
See application file for complete search history.

(56) References Cited

U.S. PATENT DOCUMENTS

| 3,814,172 | A |   | 6/1974  | Shore |
|---|---|---|---|---|
| 4,040,804 | A |   | 8/1977  | Harrison |
| 4,230,175 | A | * | 10/1980 | Disselbeck et al. ........... 165/46 |
| 4,281,642 | A | * | 8/1981  | Steinberg .................... 165/136 |
| 5,036,906 | A |   | 8/1991  | Rylewski ...................... 165/54 |
| 5,927,383 | A | * | 7/1999  | Ramm-Schmidt et al. ..... 165/46 |
| 5,992,508 | A | * | 11/1999 | Lowenstein et al. .......... 165/46 |
| 6,216,771 | B1| * | 4/2001  | Holmberg et al. ............ 165/46 |
| 6,446,706 | B1| * | 9/2002  | Rosenfeld et al. ............ 165/46 |

FOREIGN PATENT DOCUMENTS

| DE | 25 23 151 | 4/1976 |
|---|---|---|
| DE | 4007963   | 9/1991 |
| EP | 0 368 477 | 5/1990 |
| FR | 86 17714  | 6/1988 |
| WO | 91 04451  | 4/1991 |

\* cited by examiner

*Primary Examiner*—Ljiljana Ciric
(74) *Attorney, Agent, or Firm*—Staas & Halsey LLP

(57) ABSTRACT

The invention concerns an independent heat exchange unit designed to be fixed inside a building comprising a box provided with walls defining two fluid passages with an undulating cross-section and means for circulating air capable of causing countercurrent circulation in the two fluid passages of a fresh air stream drawn from outside the building and a stale air stream drawn from inside the building. The walls defining the fluid passages comprise a flexible and thin foil forming undulations capable of being deformed depending on the respective pressure levels of the fresh air stream and the stale air stream. The invention is useful for ventilating and/or air-conditioning the inside of buildings.

8 Claims, 4 Drawing Sheets

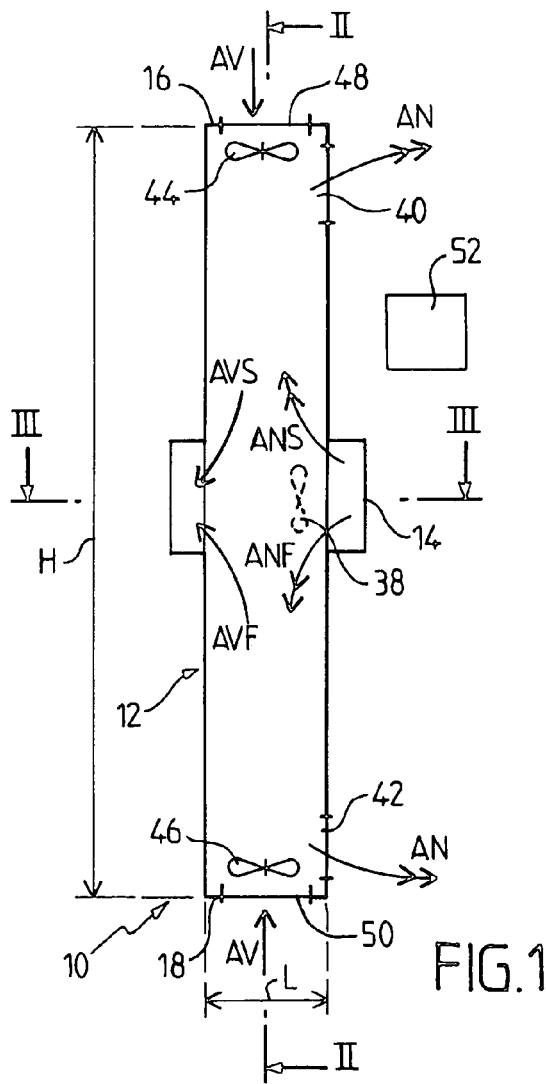
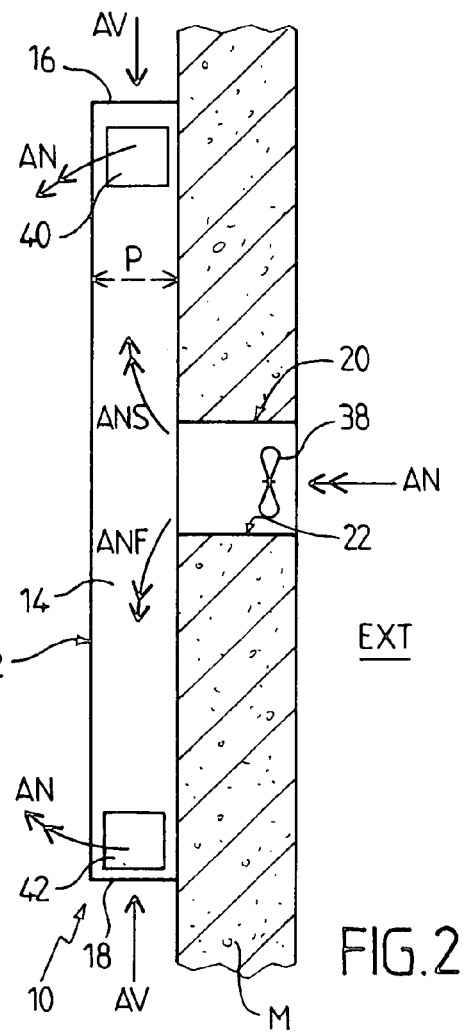
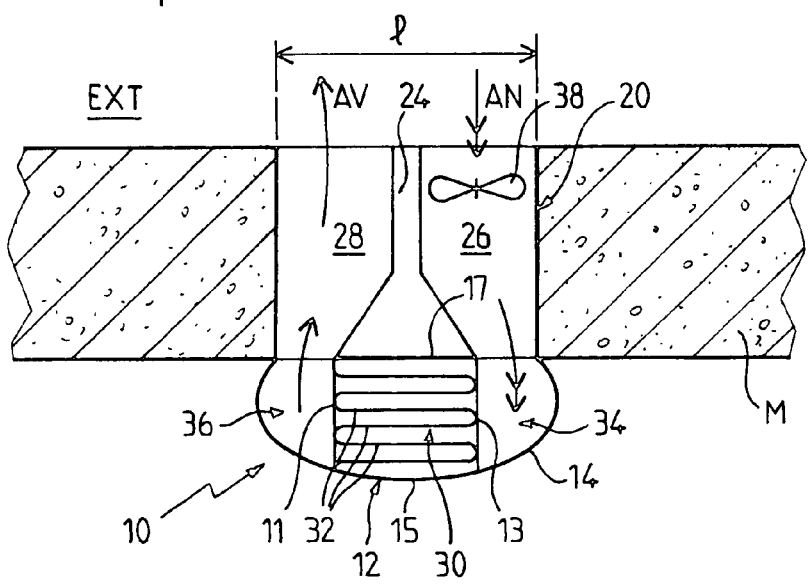
FIG. 1
FIG. 2
FIG. 3

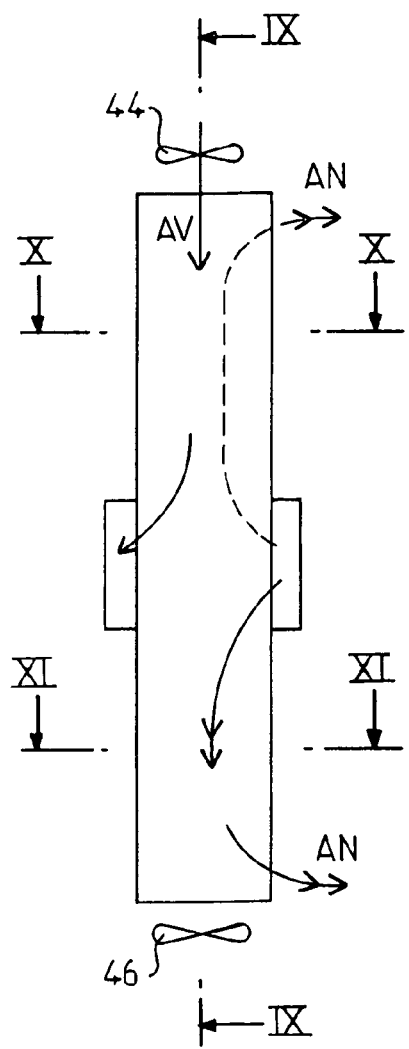
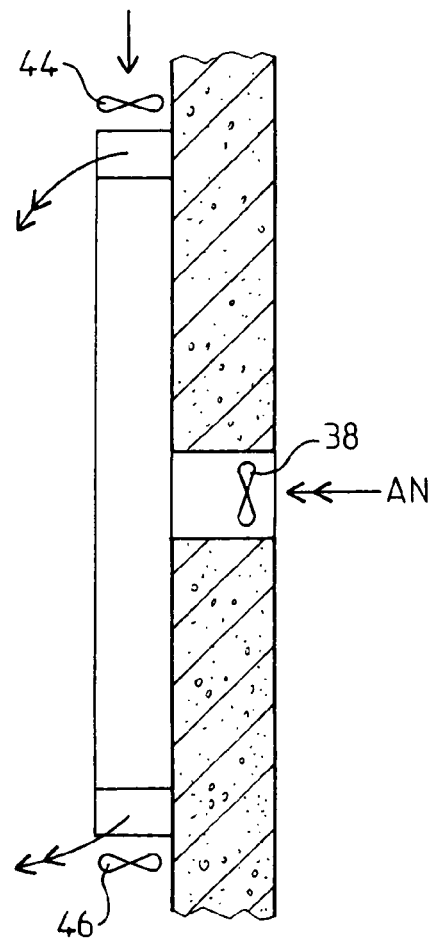
FIG.8        FIG.9
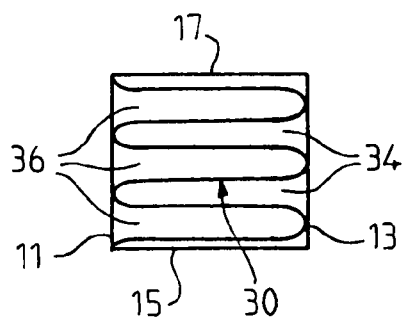
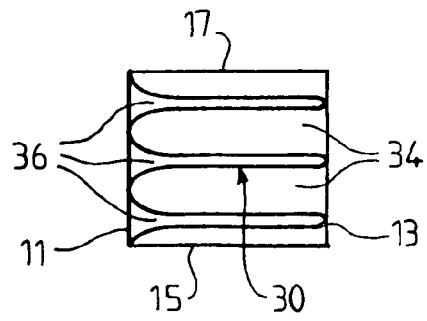
FIG.10       FIG.11

HEAT EXCHANGE UNIT, IN PARTICULAR FOR VENTILATING A BUILDING

BACKGROUND OF THE INVENTION

1. Field of the Invention

The invention relates to an independent heat exchange unit designed to be placed inside a building to provide, for example, ventilation and/or air conditioning of a part or locality inside this building.

It relates more particularly to an independent heat exchange unit comprising a box provided with walls bounding two fluid passages having an undulating cross section and means for circulating air and capable of causing counter current circulation in the two fluid passages of, on the one hand, a stream of fresh air drawn from outside the building and, on the other hand, a stream of stale air drawn from inside the building.

An independent unit of this type is described in French Patent 86 17714.

2. Description of the Related Art

This known unit allows the provision of the ventilation and/or or the air-conditioning of an area or a locality inside a building by heat exchange between a primary fluid and a secondary fluid, namely respectively the fresh air drawn from outside the building and the stale air drawn from inside the building.

The fresh air or outside air introduced into the building can, depending on the situation, be cooled or heated by the stale air which is to be discharged outside the building. The ventilation of the locality or the area is thus achieved without causing significant changes in the temperature inside the building.

In this known unit two fluid passages, also called channels, are formed inside the box and are separated by an undulating wall, generally a metallic wall, which does not always make for easy cleaning.

SUMMARY OF THE INVENTION

The invention aims in particular to provide an independent heat exchange unit of the type described which uses other materials which facilitate cleaning and which can be made at minimum cost and can offer different modes of operation with or without heat recuperation.

With this in mind there is proposed an independent heat exchange unit of the type defined in the introduction, in which the walls which define the fluid passages comprise a flexible thin foil forming undulations capable of being deformed dependent on the respective pressures of the stream of fresh air and the stream of stale air.

Thus the separation between the fluid passages, also known as channels, is achieved by a flexible foil forming undulations.

This flexible foil has the advantage of being light, of being capable of being easily removed and cleaned by simple washing, or of being able to be easily exchanged for a new foil.

Furthermore because of its flexible character, its undulations are deformable in such a way that the cross section for flow offered respectively by the two fluid passages can become modified in response to the respective quantities of the fresh air stream and the stale air stream.

Preferably the foil is made of a material which is airtight, such as a tissue or woven fabric, non-woven fabric, a plastics material, paper or the like.

This material can be impervious to water vapor if one does not wish any interaction between the two air streams, or equally well it could be permeable to water vapor such as to allow the recovery of a part of the water vapor contained in the stale air discharged outside the building.

According to another feature of the invention, the box is of generally elongated shape and the undulations of the flexible foil have generatrices which are substantially parallel and extend along the length of the box.

In a preferred embodiment the box is arranged vertically and the generatrices of the undulations are substantially vertical.

In a preferred manner the means for circulating the air comprise at least one entry (or admission) fan for introducing, into the interior of the building, a stream of fresh air taken from outside, and at least one evacuation fan for extracting, to the outside of the building, a steam of stale air coming from inside.

Preferred in particular are air circulating means comprising at least one entry fan arranged in a central region of the box and two extraction fans arranged respectively in two end regions of the box.

In the latter case, when the box is arranged generally vertically, the two extraction fans are arranged respectively in the upper part and in the lower part of the box.

It could then be arranged that the unit comprises two heat exchangers associated respectively with the two extraction fans and each having a flexible foil bounding two fluid passages.

The unit according to the invention preferably includes means for selectively putting into operation or halting the or each entry fan and/or the or each extraction fan.

In the case where the unit has one entry fan and two extraction fans, these control means are arranged to put into operation or halt each entry fan as well as putting into operation one and/or the other of the extraction fans, so as to allow different modes of operation.

In the description which follows, given by way of example, reference is made to the accompanying drawings, in which:

BRIEF DESCRIPTION OF THE DRAWINGS

FIG. 1 is a front view of a heat exchange unit according to the invention mounted against a wall inside a building;

FIG. 2 is a section on the line II—II in FIG. 1;

FIG. 3 is a section to a larger scale on the line III—III in FIG. 1;

FIG. 8 is a view analogous to FIG. 4 in another mode of operation;

FIG. 9 is a section on the line IX—IX in FIG. 8;

FIG. 10 is a section on the line X—X in FIG. 8; and

FIG. 11 is a section on the line XI—XI in FIG. 8.

Figure 4:
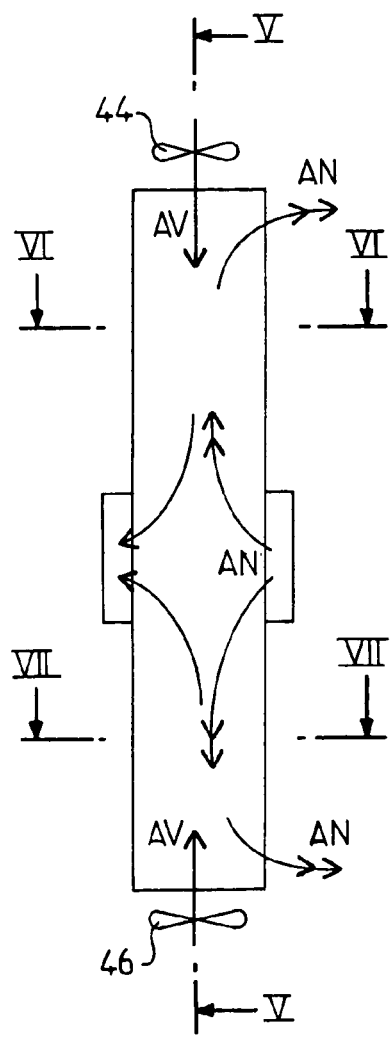
FIG. 4 is a diagrammatic illustration analogous to FIG. 1 in one mode of operation.

Reference is made first to FIGS. 1 to 3 which illustrate an independent heat exchange unit 10 designed to be placed inside a building, and fitted against a wall M of the latter.

This unit 10 is in the form of a box 12 of generally oblong shape which could have, for example, a height H of the order of 200 cm, a width L of the order of 30 cm and a depth P of the order of 15 cm.

In the example, the box 12 extends in a generally vertical direction and is bounded by two side walls 11 and 13, a front wall 15, a back wall 17, a top wall 16 and a bottom wall 18 (FIG. 3). In addition the box is bounded at mid-height by an enclosing wall 14 projecting on one side and the other of the side walls to form a local enlargement.

The box 12 is extended laterally, in its central portion corresponding to the enclosing wall 14, by a conduit 20 forming a casing and designed to extend through the wall M and open towards the outside EXT of the building (FIGS. 2 and 3). The conduit 20, which forms an integral part of the box 12 is introduced for this purpose into an opening 22 previously provided through the thickness of the wall M.

In this arrangement the conduit 20 is of square section defined by sides of length 1 with 1 greater than L, and it is divided by a partition 24 into two conduits 26 and 28. The conduit 26 serves to admit into the box 12 a flow of fresh air AN (outside air) obtained from outside the building. The conduit 28 acts to extract to atmosphere a flow of stale air AV (inside air) present within the box 12 and originating inside the building.

Placed inside the box 12 is a thin flexible foil 30 having undulations 32 in the manner of a curtain or the like. These undulations in the present case have generatrices which are substantially parallel with one another and extend in the direction of the length of the box. In other words, these generatrices are substantially vertical. The foil 30 is designed to form a heat exchange partition bounding on one side the fluid passage 34 communicating with the conduit 26 for circulating the fresh air stream AN, and on the other side a passage 36 communicating with the conduit 28 for circulating stale air AV. These passages 34 and 36 allow a counter current circulation of the two air streams, which constitute respectively a primary flow and a secondary flow to allow an exchange of heat between them. The foil 30 is made of a material which is airtight and which could for example be a foil of tissue or woven material or a foil of non-woven material, a film of plastics material, a foil of paper or the like.

Such a material offers the advantage of being particularly light and it can easily be removed from the box, either to be washed, for example by machine in the case of a tissue or a foil of plastics material, or to be purely and simply replaced by a fresh foil. Furthermore, as can be seen later, by virtue of the fact of its flexibility, the undulations of the foil can become deformed in response to the respective pressures of the stream of fresh air AN and of the stream of stale air AV, to allow controlled opening or closing of one or the other of the fluid passages 34 and 36 as a function of the mode of operation required.

The material from which the foil 30 is made can be either impervious to water vapor or permeable to water vapor with the aim of recovering some of the water vapor contained in the air extracted. This is of interest in maintaining a certain degree of moisture content within the building.

The unit 10 according to the invention includes in addition air circulating means to achieve a circulation of the streams AN and AV. Mounted inside the conduit 20 is an entry fan 38, the function of which is to introduce into the interior of the building the stream of fresh air AN originating outside.

The stream AN enters the box 12 and more particularly enters the passage 34. It divides into an upper stream ANS and a lower stream ANF (FIGS. 1 and 2). The upper stream is a rising stream and leaves the box through at least one opening 40 provided in the upper part whereas the stream ANF is a descending stream and leaves the box through at least one opening 42 provided in its lower region.

Furthermore there are mounted inside the box 12 two fans, namely a fan 44 in the upper part and a fan 46 in the lower part (FIG. 1). The fan 44 is mounted underneath the top wall 16, which is provided with an opening 48 to allow passage of the stale air AV. In addition the fan 46 is situated above the bottom wall 18, which is provided with an opening 50 allowing passage of the stale air AV.

As will be seen below, one and/or the other of the fans 44 and 46 can be put in operation. When the fan 44 is switched on a stream of stale air or upper stream AVS circulates in a descending path and passes through the conduit 28 to be discharged to the outside atmosphere. When the fan 46 is switched on a stream of stale air is taken through the lower region from the building and constitutes a rising stream or lower stream AVF which leaves the box through the conduit 28 to be discharged to the outside atmosphere.

Thus, in every case, there is achieved a heat exchange by counter current circulation between the fresh air taken from outside the building and the stale air taken from inside the building, either through the upper region or the lower region or both at once.

The fans 38, 44 and 46 are connected to a control panel 52, shown diagrammatically in FIG. 1, which can be mounted immediately alongside the box 12, or even integrated into it.

This panel allows one to control the three fans selectively depending on the required mode of operation, either manually or automatically, possibly taking into account the values of temperatures inside and/or outside the building.

Figure 5:
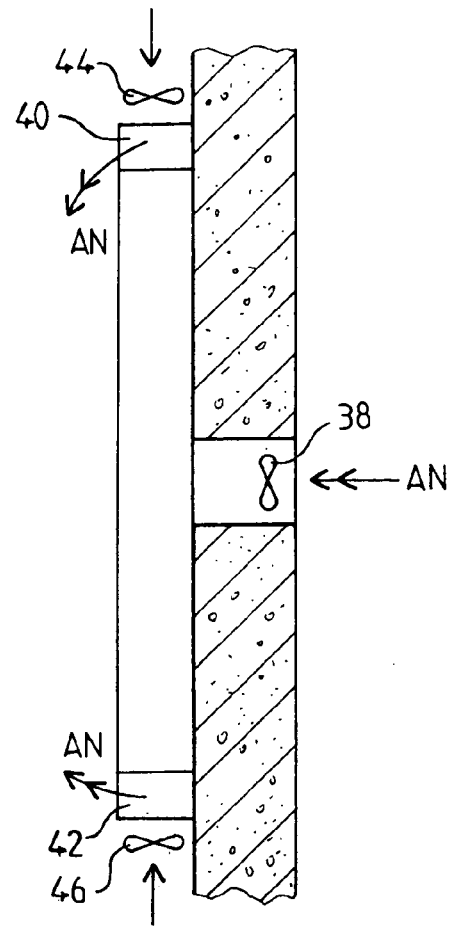
FIG. 5 is section on the line V—V in FIG. 4.
Figure 6:
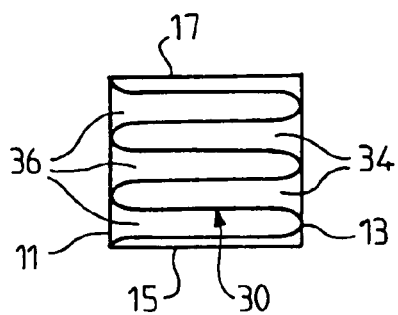
FIG. 6 is a section on the line VI—VI in FIG. 4.
Figure 7:
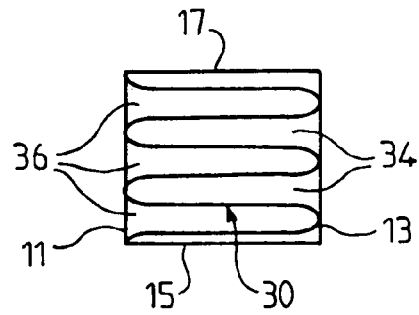
FIG. 7 is a section on the line VII—VII in FIG. 4.

We refer now to FIGS. 4 and 5 which correspond to FIGS. 1 and 2 and illustrate diagrammatically the unit 10 in a mode of operation with heat exchange. In this mode of operation all three fans 38, 44 and 46 are switched on. This means that a stream of fresh air AN obtained from outside is introduced into the area in the upper part and in the lower part respectively through the openings 40 and 42 in the box. At the same time, from the fact that the fans 44 and 46 are in operation, a stream of stale air AV is taken from high up and low down through the openings 48 and 50 and discharged to the atmosphere outside the building through the conduit 28. From the fact that the fans are operating, the fluid passages 34 and 36 are both under pressure and the folds of the undulations of the foil 30 define on one side and the other open channels providing for the circulation of the two fluids respectively (FIGS. 6 and 7).

As a result of the heat exchange thus achieved, the stream of fresh air AN which is introduced into the area is cooled or heated according to the situation, by thermal exchange with the stream of stale air AV which is extracted from the building and discharged to the outside atmosphere.

We refer now to FIGS. 8 and 9 which correspond to FIGS. 4 and 5, for a different mode of operation, without heat recuperation.

In the example, the entry fan 38 (middle fan) is running, the extraction fan 44 is also running, but the extraction fan 46 is stopped, resulting in disequilibrium in the operation.

As can be seen in FIGS. 10 and 11, the result is that the undulations of the foil 30 adopt different configurations, according to whether they lie above the conduit 20 (see FIG. 10) or below this conduit (see FIG. 11).

In the region situated above the conduit 20 the two fluid passages 34 and 36 are subjected to pressure with the result that the corresponding channels are open, both on the part of passage 34 and of the passage 36 such as to result in a low amount of heat exchange between the rising stream of fresh air ANS and the descending stream of stale air AVS present in the upper part.

By contrast, below the conduit 20, because the fan 46 is stationary, there is a significant difference in pressure between the fluid passages 34 and 36. From the fact that the passage 34 has an air stream under pressure flowing through it whereas the passage 36 has no stream of air under pressure through it the channels of the latter passage are closed, preventing the exchange of heat. The result is that virtually no stale air is taken from the lower part of the box.

It will be appreciated that it is possible to arrange to stop the fan 44 in the upper part and to set the fan 46 in the lower part running.

It is equally possible to cause the fans 44 and 46 to operate alternately, while keeping the fan 38 running, according to the mode of operation desired by user.

Equally, this mode of operation could be obtained by an automatic control, for example by means of a thermostat.

Thus it will be appreciated that when the fans 44 and 46 are both running there is an exchange of air with recuperation of the heat. On the other hand, if only one of the two is running there is an exchange of air without recuperation of heat.

When all the fans are running, the channels bounded by one part or another of the foil are open throughout their lengths and the air normally circulates on both sides of the foil with heat exchange taking place.

When only one of the extraction fans is running a disequilibrium is produced. Only the channels under pressure are open, whilst the others are flattened and virtually closed. The open channel then has a larger cross section (practically double) and thus takes more flow. Moreover where there is not a double flow there is no heat exchange.

It will be appreciated that the invention is not limited to the embodiment described above by way of example and it does extend to other variants.

For example one could envisage the box being able to be arranged in a substantially horizontal position with its fans 44 and 46 placed at the same level.

Figure 12:
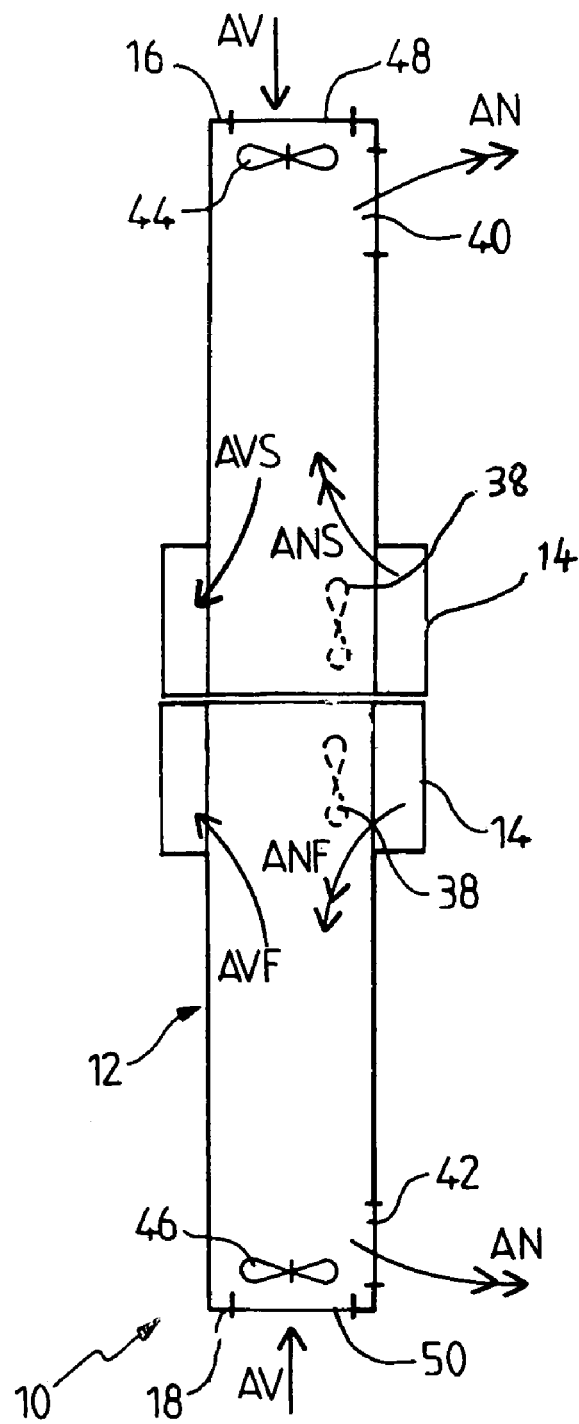
FIG. 12 is a front view of a heat exchange unit with two separate heat exchangers, each with two fans.

Equally one could envisage, as shown in FIG. 12, constructing the box in two parts, each forming a heat exchanger also having a flexible foil and one of the extraction fans. In this case each heat exchanger could have its own box and its own entry fan and its own extraction fan.

The invention claimed is:

1. An elongated heat exchange unit for a building, said unit having first and second opposing surfaces;
    a first fluid conduit and a second fluid conduit formed by a partition connected to a box which extend along the length of the unit,
    wherein the box includes an undulating foil wall deformable by air pressure, whose undulations are in fluid communication with the first and second conduits;
    an inlet located substantially midway along the length of the elongated unit to define upper and lower portions of the box, extending from outside the building and being in fluid communication with the first conduit;
    an outlet extending from the second conduit to outside the building;
    a first entry fan in the inlet draws fresh air from outside the building into the first conduit, which fresh air exits via first openings formed in the unit into a room in the building;
    a second extraction fan located at one end of the second conduit, and a third extraction fan located at another end of the second conduit,
    wherein the second and third extraction fans draw stale air from the room into the second conduit via second openings formed in the unit, respectively, and out the outlet to outside the building,
    wherein the inlet, the first conduit and the first openings are in continuous fluid communication,
    wherein the second openings, the second conduit and the outlet are in continuous fluid communication,
    wherein the fresh air and the stale air move in opposite directions across the foil wall in each portion of the unit,
    wherein, when all three fans are operating, air pressure is exerted on both sides of the undulating foil wall by the fresh and stale air, thereby opening channels in the wall, with the fresh and stale air on either side of the foil wall exchanging heat, and
    wherein, when the first and only one of the second and third fans are operating, air pressure is exerted on both sides of the undulating foil wall only in the portion of the box with the operating second or third fan, thereby opening channels in the wall only in that portion of the box having the operating second or third fan, and the fresh and stale air on either side of the undulating foil wall in that portion exchange heat, but in the undulating foil wall in the other portion of the box having only one side of the foil wall under air pressure only from the fresh air, channels are not formed, so that the fresh and stale air in this other portion of the box experiences only minimal heat exchange.

2. The unit according to claim 1, wherein the foil is air-tight.

3. The unit according to claim 1, wherein the foil is impermeable to water vapor.

4. The unit according to claim 1, wherein the foil is permeable to water vapor.

5. The unit according to claim 1, wherein the box has a generally elongated, substantially rectangular shape, and undulations of the flexible foil have generatrices which are substantially parallel to each other and extend along the length of the box.

6. The unit according to claim 1, wherein the box is arranged vertically, and the generatrices of the undulations are substantially vertical.

7. The unit according to claim 1, wherein the box is arranged horizontally, and the generatrices of the undulations are substantially horizontal.

8. The unit according to claim 1, further comprising:
    a controller for selectively running or stopping each of said first, second and third fans.

* * * * *